United States Patent [19]
Paykin

[11] Patent Number: 5,326,112
[45] Date of Patent: Jul. 5, 1994

[54] SEAL FOR HIGH PRESSURE APPLICATIONS

[75] Inventor: Alex Paykin, Skokie, Ill.

[73] Assignee: SKF USA Inc., Elgin, Ill.

[21] Appl. No.: 951,006

[22] Filed: Sep. 25, 1992

[51] Int. Cl.$^5$ .............................................. F16J 15/32
[52] U.S. Cl. .................................... 277/153; 277/188 R; 277/227
[58] Field of Search ........... 277/134, 152, 153, 188 R, 277/188 A, 207 R, 208, 227

[56] References Cited

U.S. PATENT DOCUMENTS

| | | | |
|---|---|---|---|
| 3,495,843 | 2/1970 | Andersen et al. | 277/153 |
| 4,211,152 | 7/1980 | Colletti et al. | 277/153 |
| 4,261,583 | 4/1981 | de Vries, Jr. et al. | 277/189 |
| 4,427,206 | 1/1984 | Sugiyama | 277/153 |
| 4,560,177 | 12/1985 | Riley, Jr. | 277/153 |
| 4,660,839 | 4/1987 | Mitumaru | 277/153 |

FOREIGN PATENT DOCUMENTS 1332645 10/1973 United Kingdom ........... 277/188 A

Primary Examiner—William A. Cuchlinski, Jr.
Assistant Examiner—Daniel G. DePumpo
Attorney, Agent, or Firm—James T. FitzGibbon

[57] ABSTRACT

A fluid seal assembly for use in high pressure sealing applications. The assembly includes a seal with a rigid casing having a radial casing flange and an elastomeric seal body bonded to the casing. The assembly also includes an annular lip reinforcing ring, made from a low friction material. The ring has a trapezoidal cross-section with an inner cylindrical surface closely spaced from the shaft to be sealed, an outer end face directly contacting the inner end face of the casing flange, and a beveled surface engaging and supporting an air side surface of the elastomertc seal body.

16 Claims, 1 Drawing Sheet

SEAL FOR HIGH PRESSURE APPLICATIONS

The present invention relates generally to fluid seals, and more particularly, to specialty oil seals, including those intended for use in high pressure applications.

Modern oil seals have long been effective in hydraulic mechanisms of various kinds. In addition, such seals have been used in various other applications which, although perhaps not best described as parts of hydraulic systems per se, called upon to seal oil under high forces or pressures.

With the advent of refined synthetic rubber formulations, it is possible to make an oil-resistant, virtually leak-proof seal which meets the requirements of accommodating high pressures and sealing oil effectively enough to prevent measurable leakage, while still retaining sufficient oil beneath the seal lip and its immediate environs that the lip does not itself run in an unlubricated or "dry" condition.

One recognized technique for making snug seals around a reciprocable or rotatable shaft has been the construction and arrangement of the seal lip so that pressure internal to the seal cavity causes the seal lip as a whole to be compressed radially inwardly, augmenting the compressive radial load exerted by the natural resilience of the lip body itself, and also in addition to forces that may be applied by other means, such as a conventional garter spring, a finger spring, or the like. Consequently, in use, a seal used in hydraulic or other high pressure applications is capable of functioning with a relatively modest radial load in the absence of substantial cavity pressure, while also be capable of applying a radial load that increases proportionately with a rise in cavity pressure.

While this is theoretically capable of being achieved, and is achieved with a certain degree of success as a practical matter, there is still room for improvement in seals for such hydraulic or other sealed and pressurized mechanisms.

A particular problem with a number of hydraulic seals is the tendency of the seal lip, although able to confine pressure by increases in radial load so as to exclude fluid leakage along the interface between the shaft, sector, or other seal part and the seal lip itself, to be forced axially outwardly of its intended position, and thus in effect be extruded outwardly from the seal cavity. While a minor amount of movement may be overcome, even relatively small movements are often disadvantageous. Large movements are clearly unfavorable in view of the fact that they will inherently alter the geometry of the seal lip and compromise its response to pressure in the sealed cavity. The physical repositioning of the seal lip may also cause leakage in other areas.

The present invention represents an improvement on seals which include an anti-extrusion element therein, and the invention is intended to provide better economy and reliability, and most particularly, an improvement in sealing performance under high pressure conditions. In this connection, a reinforcing ring, made in a particular configuration from a resinous material, is located by an offset shoulder in the steel casing, and is bonded along two surfaces to a portion of the seal body so as to ensure proper location and resolution of cavity forces.

In another embodiment, the seal is similarly located but not bonded to the seal lip. The invention also invokes the method of forming the subject seal.

In view of the need for a further improved seal for use in high pressure applications, it is an object of the invention to provide an improved high pressure seal having a specially configured, backup or reinforcing ring forming a part of a seal with a particular form of elastomeric seal body.

Another object of the invention is provide a method of making an improved seal with a molded-in pressure reinforcing ring.

Still another object of the invention is to provide an oil seal having a reinforcing ring arranged within a groove molded within a seal body in such a way as to minimize undue, adverse stretching and pulling of certain portions of the seal body as hydraulic pressure within the seal cavity is increased and decreased during use.

Yet another object of the invention is to provide a composite seal which is easy to manufacture and reliable in use.

Another object is to provide a seal design wherein the insert may be bonded to the lip body, or in which the seal lip is formed about certain surfaces of the ring without being bonded thereto.

A further object of the invention is to provide a low cost seal by eliminating extra assembly operation and quality assurance steps characterizing earlier seals, and which will have an extended life relative to prior art seals.

Yet another object of the invention is to provide an oil seal which is useful in high pressure applications and which includes a seal lip body with plural ribs on the air side of the sealing lip and wherein a precisely configured resinous ring is molded or bonded in place with another portion of the seal lip body. Another object is to provide a seal with a bonded insert, wherein the bonding portion of the seal body is arranged in an advantageous configuration relative to the position of the reinforcing ring.

Another object of the invention is to provide a seal having elastomeric body which, by reason of the location of its bonding areas, lip areas and reinforcing ring location is able to effectively balance internal forces within a seal cavity to produce better performance and longer life in use.

The foregoing and other objects and advantages of the invention are achieved in practice by providing a fluid seal assembly which includes a casing having a radial bonding flange and an offset portion forming an inner margin of the bonding flange, a seal body with a substantial bonding area and including a thick, axially extending bonding element, a seal band defined by the convergence of a ribbed, frustoconical air side surface, and a frustoconical oil side surface and further including a reinforcing ring secured in place within a portion of the seal body, with the ring being of trapezoidal configuration and being seated on a face of the casing offset portion, with the reinforcing ring also lying axially outwardly of the inner face of the seal body bonding element.

The manner in which the foregoing and other objects and advantages of the invention are achieved in practice will become more clearly apparent when reference is made to the following detailed description of the preferred embodiments of the invention set forth by way of example and shown in the accompanying drawings, wherein like reference numbers indicate corresponding parts throughout.

DESCRIPTION OF THE PREFERRED EMBODIMENTS OF THE INVENTION

While seals made according to the invention may be used in a number of applications, a description of one form of the inventive seal will be given wherein the intended application is a power steering unit which is required to seal low and high pressures, with the application "seeing" substantial transient variations in pressure from a very slight pressure to pressures approaching or exceeding 1800 psi.

Figure 1:
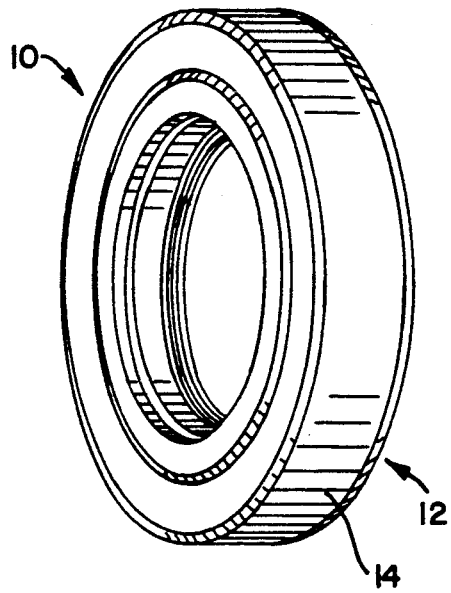
FIG. 1 is a perspective view of an annular oil seal made according to the present invention.
Figure 2:
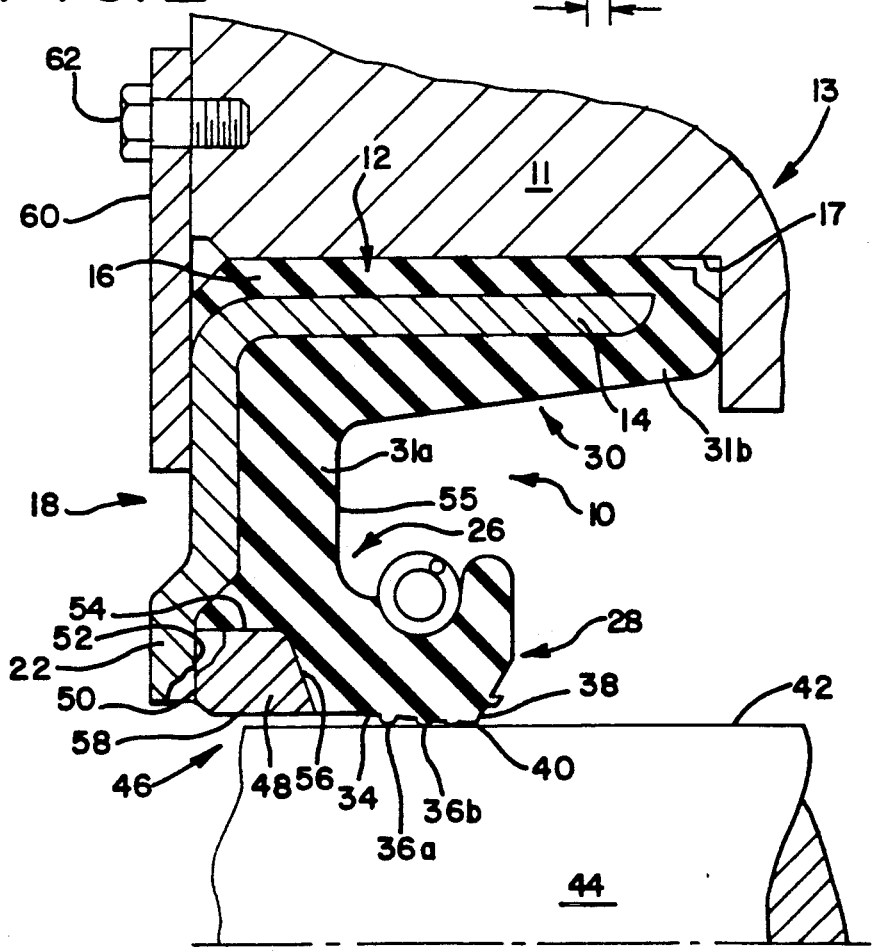
FIG. 2 is a fragmentary vertical sectional view showing the oil seal of the invention in place within an intended application including a machine element and a sealed part passing through the center portion of the seal.

Referring now to the drawings in greater detail, FIG. 1 is a perspective view of seal unit generally designated 10 and shown to embody the advantageous characteristics and features of the invention. FIG. 2 shows the seal 10 in a position of use relative to a housing 11 forming a part of a machine assembly generally designated 13. The seal unit 10 includes a rigid metal casing generally designated 12 and shown to include an axially extending, generally cylindrical mounting section 14 to which is bonded a cylindrical, outer rubber sleeve 16. This form of seal, commonly referred to as a "rubber OD" seal is one wherein the outer surface 15 of the rubber sleeve bonded to the mounting section 14 contacts the metal surface of a counterbore 17 formed in the housing 11 in snug sealing engagement.

The casing unit 12 also includes a radial flange generally designated 18, and this in turn is shown to include a radially outer bonding portion 20, and an inner, offset portion 22 adapted to locate a reinforcing ring in a manner to be described. An axial shoulder 24 joins the offset flange 22 to the radial flange 18, thus forming a locating pocket for the reinforcing ring.

Another principal element of the seal unit 10 is an elastomeric seal body generally designated 26, and shown to include a flexible lip body generally designated 28, and a contoured bonding element generally designated 30. The bonding element includes both a radially extending body 31a and an axially extending body 31b. The seal body 26 further includes a spring groove 32 adapted to accommodate a radially acting garter spring 33. The lip body 28 is further defined by an air side frustoconical surface 34, which desirably includes plural, circumferentially extending spaced apart, lubricant-retaining ribs 36a, 36b, etc., each of which is of a different diameter. The rib diameters increase axially, generally paralleling the diameter increase in the surface 34.

Figure 3:
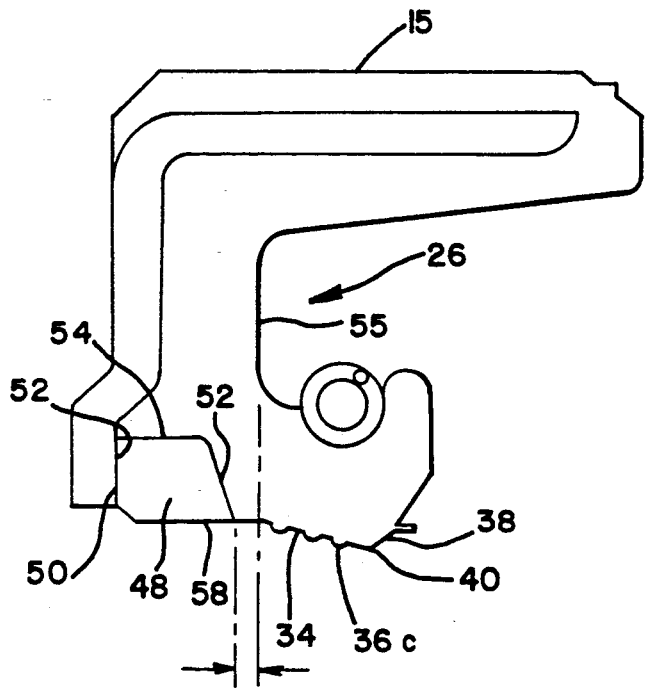
FIG. 3 is a simplified, diagrammatic illustration of certain elements of the seal showing particular features of the elements of the seal.

In this connection, the expression "axially inner" as used herein and in the claims, means toward the sealed region or toward the right as shown in FIGS. 2 or 3, whereas "axially outer" means away from the sealed region or to the left as shown in FIGS. 2 and 3.

Referring again to the drawings, the lip body 28 also includes a frustoconical oil side surface 38 which is inclined more steeply relative to the axial center line of the seal than is the air side surface 34, and the two surfaces 34, 38, meet along a generally circular locus forming a seal band 40 which, in use, contacts the outer surface 42 of a rotary or reciprocating shaft 44.

Seals made according to the present invention are able to prevent leakage while allowing either rotary or reciprocating motion, and also are effective in mechanisms wherein the shaft, sector, or the like undergoes both kinds of motion. Customarily, the region 45 lying on the oil side of the seal, outside the shaft surface 42 and inwardly of the counterbore 17 is surrounding the inner end of the shaft 44 (that extends through the opening formed by the counterbore 17) pressurized at least occasionally by the output of a hydraulic pump (not shown) operating a part of a rack and pinion type steering gear apparatus in an automotive application, for example.

Referring again to the drawings, it will be noted that a reinforcing and anti-extrusion ring generally designated 46 is provided, and this ring 46 has a body 48 which is trapezoidal in cross section. The axially outer end face 50 of the ring 46 is in snug continuous contact with the axially inwardly directed end face 52 of the offset flange 22. The body 48 of the ring 46 includes a cylindrical outer surface 54, and a beveled, force-transmitting surface 56, with its remaining surface 58 being an innermost surface of cylindrical configuration. This surface 58 is adapted in use to be spaced apart by only the slightest working clearance from the outer surface 42 of the shaft 44.

Inasmuch as the seal unit 10 is used in a high pressure application, it is not uncommon for the entire seal unit 10 to be held in place against axial movement by an exterior locking ring 58 secured by a clamp arrangement 60 which is fastened to the housing 11 by suitable fasteners 62 or the like. As is known to those skilled in the art, the seal may alternatively be retained against popping out by snap rings adapted to be received in grooves formed in the housing, or by other expedients known to the industry.

Referring now to an important feature of the invention, both the beveled and outer cylindrical surfaces 54, 52 are permanently and securely located relative to the seal body 26. In one embodiment, the ring 46 is bonded to the seal body 26. The axially innermost portion of the ring is the beveled surface 54, and this surface is intentionally located axially outwardly of the radial surface 55 defining the radial end face portion of the seal body bonding element 31a.

Referring now to the operation of the seal in use, when the seal is assembled with the shaft 44 passing through the opening defined by the seal band 50, and high pressure is created within the sealing cavity 45, the forces acting radially on the lip body 28 tend to urge it into tighter sealing contact with the shaft. While radial forces which act from a point axially inwardly of the seal band are neutral in that they are exactly offset by radially outwardly acting hydraulic forces, the radial forces acting on the part of the seal lip which lies axially outwardly from the seal band are not resisted by hydraulic pressure inasmuch as the outer surfaces in this region are exterior to the sealed region, and hence "unsupported" or unpressurized by the hydraulic fluid.

Referring now to the action of the reinforcing ring, forces transmitted through the lip body reach the ring and are thence transmitted to the offset flange 22. Preferably, the ring 46 is made from a hard synthetic material such as a nylon (polyamide) or "Delrin" (polyacetal) material. The rigid, tough nature of the material comprising the reinforcing ring prevents possible extrusion or creeping of the lip body toward the exterior of the sealed region.

In the prior art, provision of backup or reinforcing rings for anti-extrusion purposes are known. However, such rings have customarily not been molded or bonded in place, it having apparently been believed that the ring should accommodate substantial movement so as to be free to move to accommodate possible runout in the shaft or other sealed part. It was believed that such runout could, in the case of a bonded insert, move the ring and thus draw the lip away from the shaft to be sealed. In addition, locating the ring precisely relative to the center of the casing and/or the lip was considered difficult or problematic.

However, it is possible to locate the reinforcing ring precisely. One manner in which this can be done is to provide the pocket in the casing or stamping defined in part by the shoulder 24 and the offset surface 22. This pocket or shoulder can serve to locate the ring. In addition, it is possible to locate the reinforcing ring by positioning the guide surfaces lying within the mold, preferably those providing a slight taper to permit ring insertion and retention prior to insertion of the casing within the mold. In this way, both the casing and the ring or like insert are positioned in the mold before the rubber enters the molding cavity.

According to the invention, it is possible to form the sealing lip so that it surrounds in part, but is not bonded to, the ring element. It is also possible, in keeping with the invention, to bond the ring to the seal lip body.

Assuming that the bonded version of seal is to be formed, the surface of the portions of the reinforcing ring that will abut and be bonded to counterpart surfaces of the lip are prepared, as by grit blasting or other toughening operation for bonding. Thereafter, the surfaces so prepared are coated with a suitable adhesive. In a manner similar to bonding other elastomers, the fluent, curable elastomer will bond not only to the similarly prepared metal surface, but also to the plastic reinforcing ring.

If it is desired to form the seal lip from elastomer, but not to bond the reinforcing ring in the seal lip body together, the surface treatment, including adhesive application, is avoided and the seal is molded in the usual manner after the reinforcing ring in casing have been inserted in the mold.

In those instances wherein the elastomer forming the seal lip is bonded to both surfaces of the reinforcing ring, possible weakening, cracking or shearing of the lip body arising from points of undue stress concentration, can be avoided. This may have occurred in the prior art if there were sharp corners or cuts in the molded part, with such surfaces being subjected to extreme forces created by pressure differentials. The likelihood of such stress concentrations creating strong shearing stresses can be minimized by the bonding operation.

However, with the use of a proper design that avoids sharp corners and particularly a design not permitting measurable relative movement of the reinforcing ring relative to the groove created in the seal body, it is not strictly necessary to provided bonding. In such cases, as long as the inserted reinforcing ring and the adjacent portions of the seal lip body move together and are subjected to the same forces, and a satisfactory, seal life can be achieved even under high pressures and throughout a life cycle involving significant pressure variations.

A preferred feature of the invention is the provision of an offset surface for contact between the outer end face of the ring and an inwardly directed end face of the casing. The offset flange or effective creation of a recess permits the beveled surface 54 to lie axially outwardly of the end face surface 55 of the bonding element 31a, thus insuring that the forces applied to the lip body are virtually all axially directed rather than being compressive forces which might displace the reinforcing ring radially or tend to separate it from the elastomer.

In the preferred form of seal, the elastomeric lip body 28 is made from a relatively pliable elastomer such as a nitrile rubber. However, chemically-resistant rubbers or high temperature rubbers such as fluoroelastomers may be used in the applications in question. Where a rubber materials is used, it may have one or more of its working surfaces coated with a fluorocarbon material, such as a tetrafluoroethylene polymer. Such a coating may be in the form of a thin film of TFE resin bonded to an elastomer or may comprise a thinner, spray-applied coating or the like.

The backup or reinforcing ring 46 is preferably made from a nylon material but, as pointed out above, other synthetic resins such as acetal or polycarbonate resins may be provided. The interior surface 58 of the backup ring is shown as being cylindrical, but this unit may have a surface texture of plural, closely spaced apart ribs or the like. Other materials are suitable for use with the inventive product and their use will occur to those skilled in the art.

However, it is considered necessary that the backup or reinforcing ring be of a hard, deformation-resistant material. In one embodiment, the material should have natural adhesion to the elastomer, or the ring surface should be susceptible of treatment that will provide adhesion. When the ring is not to be adhered to the elastomer body, it should nonetheless be inert or non-reactive to the rubber. It is also required that the material comprising the backup or reinforcing ring be able to withstand the temperatures involved in molding the elastomer, such temperatures commonly being 275° to 325° F. or slightly more.

While locating tabs or the like have not been shown, it is possible to use such tabs or other auxiliary aids for positioning the backup ring to increase its positional accuracy during the molding process.

The seal unit may optionally include the rubber outer diameter sleeve or coating shown, or may have a metal casing adapted to seat directly on a counterbore in a machine element closed off by the seal assembly of the invention. Retaining the seal within the counterbore against the high pressures normally encountered may by achieved by separate backup rings, by outwardly-acting snap rings, or the like. Such retention means are commonly used but are not a feature of the invention which is novel per se.

It will thus be seen that the present invention provides a novel high pressure seal unit having a number of novel advantages and characteristics, including those referred to specifically herein and others which are inherent in the invention. A preferred form of seal made according to the invention having been described in detail, by way of example, it is anticipated that variations in the described form of construction may occur to those skilled in the art, and that such variations may be made without departing from the spirit of the invention or the scope of the appended claims.

I claim:

1. A fluid seal assembly intended for use in high pressure sealing applications, said seal assembly comprising, in combination, a seal casing made from a rigid metal material and including a generally axially extending, cylindrical section for mounting relative to a first element of a multi-piece mechanism to be sealed, and a generally radially extending casing flange jointed at its outer margin to said cylindrical section, with said radial casing flange including a radially outer portion for bonding to an elastomeric seal body, and a radially inner margin portion, an elastomeric seal body formed in a single piece, and said seal body having a bonding element portion and a lip portion, said bonding element portion being joined to both said cylindrical casing sections and to said radially outer portion of said radial casing flange, said bonding element having an axial thickness greater than the thickness of said radial casing flange where said bonding element and said casing are secured to each other, said seal lip portion being radially flexible and having a lip body defined at least partially by a spring groove, a frustoconical air side surface and a frustoconical oil side surface, said surfaces meeting along a generally circular locus to define a seal band of intended contact with the outer surface of a second element of said multi-piece mechanism, said seal lip body further including generally cylindrical and beveled surfaces forming, in combination with said radially inner casing margin, a ring-receiving groove, and an annular lip reinforcing ring of trapezoidal cross-section made from a low friction material, said ring having an axially outer end face in direct contact with the axially inner end face of said radially inner margin of said casing radial flange, a generally cylindrical outer surface and a beveled, axially inner surface, with both of said cylindrical and beveled surfaces lying axially outwardly of the axially inner surface of said bonding element, said ring also having a generally cylindrical inner surface of very slightly increased diameter relative to the diameter of an associated shaft to be sealed, said reinforcing ring and said radially inner casing margin providing resistance to axial extrusion of said seal lip body.

2. A fluid seal assembly as defined in claim 1 wherein said air side surface of said seal lip body includes a plurality of axially spaced apart, circumferentially extending ribs, said ribs being spaced apart from each other in an axially outward direction, the spaces between said ribs being such that lubricant can be entrapped between them to provide increased lubrication of said second element.

3. A fluid seal assembly as defined in claim 2 wherein each of said circumferentially extending ribs, is of the same height relative to said air side surface of which they form a part, and in which said ribs are of a gradually increasing diameter in an axially outward direction.

4. A fluid seal assembly as defined in claim 1 wherein said generally axially extending cylindrical section of said seal casing further includes an elastomeric sleeve bonded to the exterior surface thereof, the outer surface of said elastomeric sleeve being of substantially cylindrical configuration.

5. A fluid seal assembly as defined in claim 4 wherein said elastomeric sleeve is formed as a continuous body with said bonding element portion of said seal body.

6. A fluid seal assembly as defined in claim 1 wherein said reinforcing ring is made from a nylon material.

7. A fluid seal assembly as defined in claim 1 wherein said reinforcing ring is made from a polycarbonate resin material.

8. A fluid seal assembly as defined in claim 1 wherein said reinforcing ring is made from an acetal resin material.

9. A fluid seal assembly intended for use in high pressure sealing applications, said seal assembly comprising, in combination, a seal casing made from a rigid metal material and including a generally axially extending, cylindrical section for mounting relative to a first element of a multi-piece mechanism to be sealed, and a generally radially extending casing flange joined at its outer margin to said cylindrical section, and said radial flange including a radially outer portion for bonding to an elastomeric seal body, and a radially inner, offset casing portion joined to said bonding portion by an axially outwardly extending shoulder, an elastomeric seal body formed in a single piece, and said seal body having a bonding element portion and a seal lip body portion, said bonding element portion being joined to both said cylindrical casing sections and to said radially outer portion of said bonding flange, said bonding element having an axial thickness greater than the thickness of said radial casing flange where said bonding element and said casing are secured to each other, said seal body lip body portion being radially flexible and having a body defined at least partially by a spring groove, a frustoconical air side surface and a frustoconical oil side surface, said surfaces meeting along a generally circular locus to define a seal band of intended contact with the outer surface of a second element of said multi-piece mechanism; and an annular lip reinforcing ring of trapezoidal cross-section and being made from a low friction material, said ring having its entire axially outer end face lying adjacent and in facing relation to the axially inner end face surface of said casing offset portion, a cylindrical outer lip contact surface and a beveled, axially inner lip contact surface, with each of said surfaces being in snug facing contact with said elastomeric seal body and lying with a seal body groove defined by surfaces facing said cylindrical and beveled ring surfaces, with both of said cylindrical and beveled surfaces lying axially outwardly of the axially inner surface of said bonding element, said ring also having a generally cylindrical inner surface of very lightly increased diameter relative to the diameter of an associated shaft to be sealed, said reinforcing ring providing resistance to axial extrusion of said seal lip body.

10. A fluid seal assembly as defined in claim 9 wherein said air side surface of said seal lip body includes a plurality of axially spaced apart, circumferentially extending ribs, said ribs being spaced apart from each other in an axially outward direction, the spaces between said ribs being such that lubricant can be entrapped between them to provide increased lubrication of said second element.

11. A fluid seal assembly as defined in claim 10 wherein each of said circumferentially extending ribs, is of the same height relative to said air side surface of which they form a part, and in which said ribs are of a gradually increasing diameter in an axially outward direction.

12. A fluid seal assembly as defined in claim 9 wherein said generally axially extending cylindrical section of said seal casing further includes an elastomeric sleeve bonded to the exterior surface thereof, the outer surface of said elastomeric sleeve being of substantially cylindrical configuration.

13. A fluid seal assembly as defined in claim 12 wherein said elastomeric sleeve is formed as a continuous body with said bonding element portion of said seal body.

14. A fluid seal assembly as defined in claim 9 wherein said reinforcing ring is made from a nylon material.

15. A fluid seal assembly as defined in claim 9 wherein said reinforcing ring is made from a polycarbonate resin material.

16. A fluid seal assembly as defined in claim 9 wherein said reinforcing ring is made from an acetal resin material.

* * * * *